May 15, 1962
F. MAILLARD
3,034,192
METHOD FOR PRODUCING MOLDED ARTICLES OF
CONCRETE AND THE LIKE MATERIAL
Filed July 11, 1957
2 Sheets-Sheet 1
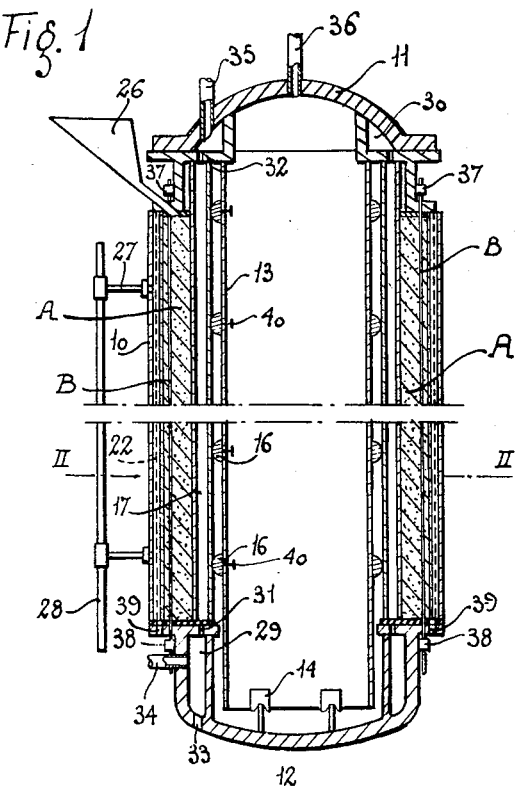
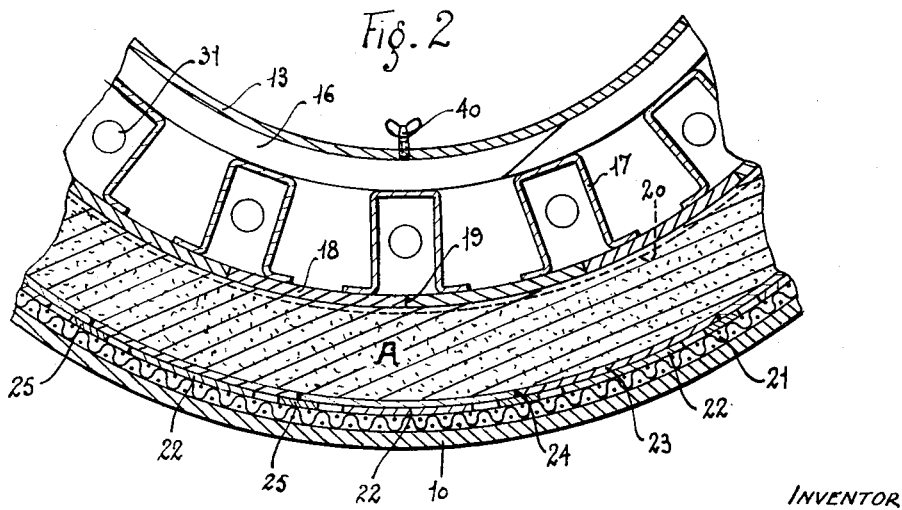
INVENTOR
FÉLIX MAILLARD
BY Irwin S. Thompson
ATTY.

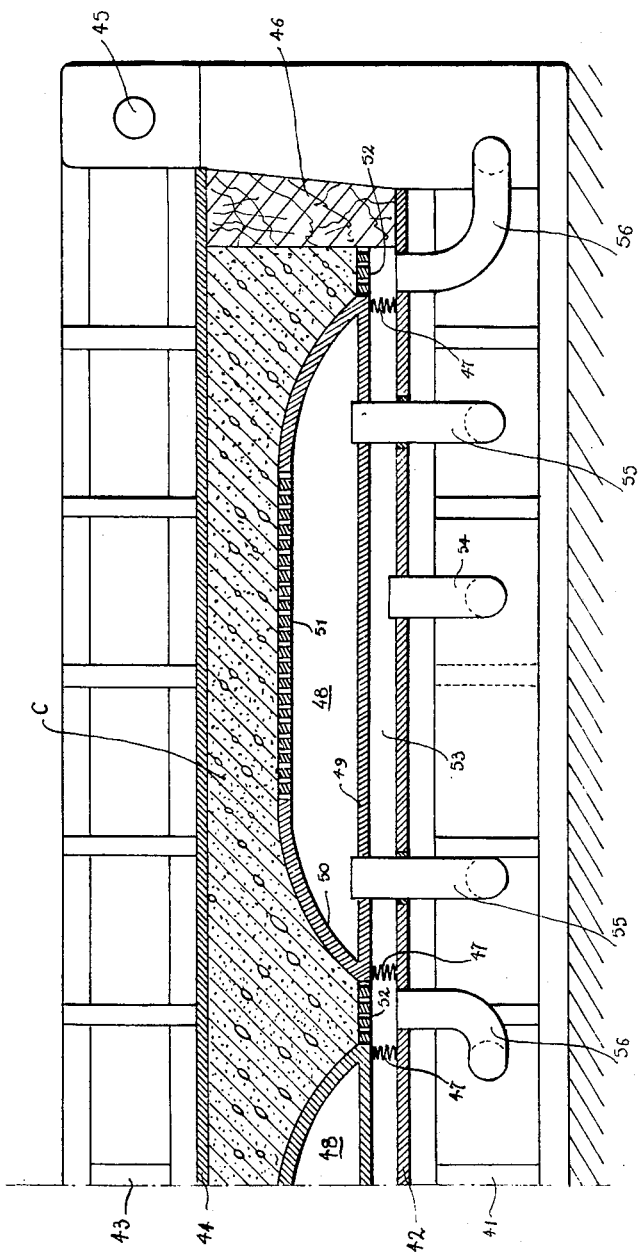

3,034,192
METHOD FOR PRODUCING MOLDED ARTICLES OF CONCRETE AND THE LIKE MATERIAL
Felix Maillard, Paris, France, assignor to Industrial Development Co. (Establishment), Vaduz, Liechtenstein, a corporation of Liechtenstein
Filed July 11, 1957, Ser. No. 671,183
1 Claim. (Cl. 25—155)

The invention has for its object the production of molded articles of concrete or the like material such as pipes, electric posts, or the like, lining slabs for irrigation channels, ties for railroads, hollow wire-carrying slabs, panels and the like structural elements, solid slabs for the coating of roads and airport runways, navigation canals and the like.

The invention is applicable to the manufacture of moulded concrete articles, reinforced or otherwise, pre-stressed or otherwise. The concrete may be loaded with fibrous or insulating material, pumice stone or the like.

It is well known that the moulding can be obtained more speedily and the duration of occupation of the mould may be reduced by producing within the mass of concrete a stream of air or stream which drives the excess water out of the concrete, said gasiform stream being applied under pressure directly against one of the surfaces of the article which is being molded and cooperating possibly with a suction exerted on the other surface. This method allows a substantial reduction in the duration of molding, but the articles obtained are not always homogeneous and they often show cracks and small channels or pipings along their surface or within their mass.

It is a well known fact, on the other hand, that the setting of the concrete is sped up through a rise in temperature and that such a contrivance leads to an ageing of the concrete which is more rapid than under conventional conditions at room temperature.

The present invention has for its object a method according to such prior modus operandi, which improves considerably the grade of the products obtained while reducing substantially the duration of production.

Said improved method is characterized by the fact that the material is subjected during its moulding first to a permanent mechanical compression and then to a diffusion of fluid in at least two stages, the first stage consisting in blowing compressed air until the excess water is expelled while the second stage consists in applying a hot fluid such as air or steam while the mass is subjected to a temperature of 120/180° C.

According to this method, there is first applied to the mass which is being molded a mechanical compression which can be obtained through the expansion of a wall of the mold under the action of a fluid, whether cold or hot.

This being done, compressed air is admitted into the mass so that said air diffuses inside the latter and passes entirely through it, which avoids the formation of preferential channels. Said air, the pressure of which may vary between 3 and 10 kgs. per sq. cm. and may be constant or pulsatory at the rhythm of 3 to 10 cycles per second, breaks the inner capillary pressure and drives out the excess water of the concrete.

During this draining stage, the volume of the molded mass diminishes gradually as the water is exhausted out of it since the molded material is highly compacted through the application of a mechanical compression during the molding.

During this stage, it is possible to adjust as required the ratio between the water and the cement of the concrete mass. This allows resorting to a very liquid concrete, the ratio between the water and the cement being substantially equal at the start to unity which furthers the feeding of the mold and the production of compound or very thin parts. The ratio between the water and the cement is then adjusted and raised to any desired value through the modification of the duration of application of pressure. This ratio is checked through the measuring of the volume of water exhausted out of the concrete. The final ratio of water versus cement is generally selected so as to be of the order of 0.40 and this may be obtained readily in an accurate manner.

During the second or digesting stage, the application of steam under a constant or pulsatory pressure of 3 to 10 kgs. per sq. cm, produces first during the diffusion of the steam inside the molded mass a condensation of the steam which is removed as it is being formed through the diffusion of the compressed air since the latter is held at the same pressure as the steam during the time required for said exhausting of the condensate. The steam is exhausted in its turn after the water, when a short period of 2 to 15 minutes has elapsed since no further condensation is produced and the concrete the setting of which has begun shows then a sufficient resistance for allowing an immediate lifting when no prestressing is required; the ageing of the concrete is obtained in this case in accordance with conventional methods.

It is possible, according to the present invention, to make said second stage last still less time by providing the initial mechanical compression through the agency of steam or the like hot fluid so as to heat the expansible wall and to limit the condensation of water at the beginning of the digesting stage.

When the cencrete is pre-stressed or when it is desired to obtain an article which may be used as soon as it has been lifted, it is necessary to continue the digesting treatment, but the diffusion of air is then cut out and the steam pressure may be increased. The concrete is quickly heated up to a temperature of 120 to 180° C., which ensures a physical and chemical transformation which may be termed a silica-lime effect as provided through reaction between the very fine silica particles and the free lime of the cement. This effect bestows the molded member, together with rapid setting conditions, with a favorable campacity and a high resistance which may reach a value of 1,000 kgs. per sq. cm.

It should be remarked that these particularly advantageous properties of the articles obtained could not be obtained hitherto on an industrial scale and that they could not be foreseen in accordance with any prior methods which provided for a steaming of the concrete that could not be executed at a temperature above about 80° C. without disorganizing and dehydrating the material. One of the features of the invention consists in showing the improvement of the molded material obtained through the simultaneous effect of a preliminary draining and of a rise in temperature up to 120° C. and above.

This possibility provided by the invention of raising the concrete to such high temperatures without disorganizing it is of primary interest and this result is obtained because the entire treatment including the digesting stage is executed throughout the mass while the latter is being subjected to a straining in the three directions of space. This allows also increasing considerably the adherence between the concrete and the steel reinforcement and even cutting out practically the shrinking of the latter in the case of a prestressing and subsequent releasing thereof.

On the other hand, the efficient diffusion of the steam through the mass subjected to compression prevents any dehydration and it allows furthermore a homogeneous digesting of mixtures of concrete with pumice stone, puzzolana or insulating material, whereas all steaming and digesting methods known hitherto did not allow the treatment of concrete throughout its mass.

After the stage of treating with steam or simultaneously with said stage, it is possible to subject the article which is being cast or molded to the pressure of another fluid having a chemical or physical action so as to bestow said member with particular properties. It is possible to execute this actual treating stage of the concrete through the agency of gases such as vaporized sulfur, silicon tetrafluoride or through the agency of liquids such as solutions of elastomeric siliconates or resins or any other suitable fluid which allows improving the treatment and thereby the final grade of the molded concrete.

In the production of the method disclosed, there is used a mold provided either with two operative surfaces or with a single operative surface. In the first case, the compressed fluid applied against one surface passes out of the article through the other surface. In the second case, the fluid applied into an area of the operative surface passes out of another area of the latter. This latter case is more particularly of interest when it is desired to obtain a surface having a particular desired appearance or which is provided with a special waterproof coat; the facing surface is then provided on an inoperative surface of the mold and only the operative surface of the mold is designed so as to act both as a diffusing and filtering area.

Accompanying drawings illustrate by way of example an embodiment of such a mold intended for the execution of the improved method according to the invention. In said drawings:

FIG. 1 is a longitudinal cross-section of the entire mold.

FIG. 2 is a partial transverse cross-section on a larger scale through line II—II of FIG. 1.

FIG. 3 is a longitudinal sectional view of a further embodiment of the mold intended for the execution of my improved method.

The mold illustrated in FIGS. 1 and 2 is of a cylindrical shape and is intended for the production of pipes or shells. However, it may be given any other desired polygonal, elliptica or the like shape, whether symmetrical or otherwise, according to the shape to be given to the molded article. The mold may also be designed for the simultaneous production of two or more articles, symmetrical or otherwise, such as the linings of an irrigation channel, a post or the like.

The mold illustrated includes a cylindrical shell 10 made of one or more sections and associated with two covers 11 and 12 adapted to resist the operative pressure, the whole arrangement forming a digester providing a joint of rigid and elastic materials adapted to resist high temperatures. Inside the shell 10 is provided a hollow core carried by supporting members 14.

The core 13 carries outwardly at suitably spaced locations rings 16 which are adjustably positioned through the parts 40, which allows modifying partly or entirely the diameter of the expansible system. Over said rings are positioned channel members 17 in the shape of an omega, the openings of which face outwardly and outside the successive members are secured metal or the like sheets 18. The latter join one another when the mould is inoperative along lines 19 registering with the plane of symmetry of each channel member 17. When the mold is operative, the sides of the members 17 are spaced under the action of fluid pressure and the joints 19 open and form a narrow slot.

It is apparent that the system including the members 17 and 18 forms a system of staves which is both permeable and expansible. It is also possible to associate with said system an expansible filtering or diffusing layer 20 made of metal gauze, a porous or elastic material such as leather, natural or synthetic rubber, a sintered or woven plastic material or the like.

Inside the shell 10 is fitted a grid 21 the meshes of which are more or less large according to requirements. A number of spaced carrier sheets 22 are fitted over the inner surface of the grid 21 and carry in their turn on their inner surfaces a plurality of longitudinal strips 23 joining each other as shown at 24. These strips 23 form a further air-permeable and expansible system of staves opening along narrow slots at the joining lines 24 between the sheets 22. Outside said slot 24 may be provided in registry therewith strips 25 of porous heat-resisting material inserted between the sheets 22.

It is apparent that this arrangement allows providing along the inner surface of the shell 10 a permeable area. Between the cylindrical systems 18 and 23 is formed the molding chamber A for the concrete. The latter is introduced through the hopper 26 after a preliminary positioning if required of the reinforcing bars B of steel or the like material, whether prestressed or otherwise.

The shell 10 carries the pipes 27 for feeding fluid under pressure, which are fed thereto through the pipe 28. Each of the covers 11 or 12 includes an annular chamber respectively 29, 30 communicating through the corresponding ports 31, 32 with the inside of the longitudinally extending channel members 17. Said chambers may be fed through the ports 33, 34, 35. An admission of fluid is provided at 36 through the cover 11 for feeding the inside of the core 13 and the space between the latter and the metal sheets 18. The whole arrangement is carried on a frame which provides for its pivotal movement or for any other useful operation.

To either side of each end of the shell 10 are provided, at any suitable location with a distribution throughout the periphery of the mold, clamping members 37 and 38 which allow holding and if required tensioning for stressing purposes the reinforcing bars B extending inside the molding chamber A. Ports 39 are provided for exhausting the water from the concrete.

For producing with such a mold a concrete article, the chamber A is filled under pressure or through injection through the hopper 26 with liquid concrete. Before this is done, the reinforcing bars B, if any, should be positioned and in fact, in the case of prestressed concrete, these reinforcing bars should be prestressed through the agency of the clamping members 37 and 38. The compressed air admitted through the pipe 36 under a pressure ranging between 3 and 10 kgs. per sq. cm. acts on the channel irons 17 so as to produce a mechanical pressure on the molded mass and to open the slots at the joints 19.

This being done, compressed air is admitted under a suitable pressure through the ports 34 and 35 and it is guided through the ports 31 and 32 into the inside of the channel irons 17. Said air passing through the slots 19 passes also through the porous screen 20 and reaches the concrete mass. It is diffused inside the latter and drives the excess water outwardly into the permeable area provided on the inside of the wall of the shell 10 and this water is removed through the ports 39.

It is also possible, if required, to proceed in a reverse manner and to admit compressed air to the pipe 27, said air being distributed by the stave system 21—22—23 and entering the concrete through the slots at 24. The excess water is speedily removed through the slots 19 and exhausted at 33.

Steam or the like fluids may be admitted under the same condition as the air for the digesting or the like treating stage.

The entire operation may be rendered automatic through a system of suitably controlled means.

The embodiment disclosed should not be construed in a limiting sense and obviously instead of the channel members, any other means may be arranged for the same purpose between the core and the concrete; provided a suitable freedom of expansion is left for the inner wall of the mold; this may be obtained for instance by replacing the steel or the like channel members by elastic members having a suitable shape such as that of a Z, of saw teeth or the like.

In the modified embodiment illustrated in FIG. 3, the mold is provided with only one operative surface through which both the diffusion of the fluid and the exhaust of the excess water and fluid are performed. The mold illustrated in FIG. 3 encloses a molding space C intended for the production of a concrete panel intended for the formation of a wall or partition. It includes a stationary frame 41 constituted by a suitable metal beam on which rests a stationary solid metal sheet 42. The other section of the mold which is movable includes a further frame or beam 43 to which is secured a further solid metal sheet 44. This frame or beam 43 is secured to the first mentioned frame 41 through a pivotal or sliding connection 45. The spacing between the metal sheets 42 and 44 is maintained by wedges 46 of wood or the like suitable material.

Over the metal sheet 42 are mounted chambers 48 through the agency of elastic bellows 47 made of thin sheets of metal or the like elastic material. Each of these chambers includes a solid bottom 49 rigid with an upper incurved partition 50 the central portion 51 of which is made of permeable porous material. Between two adjacent chambers 48 is provided a wall 52 of permeable material rigid with the bottoms 49 of said chambers.

It is apparent that with such an arrangement, a free space 53 is provided between the metal sheet 42 and the bottom walls 49 of chambers, the height of said space varying as a consequence of the elasticity of the bellows 47. Into said space open the pipes 54 admitting compressed air.

Inside the chamber 48 open pipes 55 for the admission of hot air of steam and in front of the permeable walls 52 are arranged pipes 56 for the exhaust of water or of the treating fluid.

To proceed with the molding, the frame 43 and metal sheet 44 are raised and concrete is poured into the molding chamber C over the chambers 48. This being done, the mold is closed.

Compressed air is then admitted through the pipe 54, which produces a mechanical compression through the chambers 48 whereby the concrete is made more compact. Thereafter compressed air is admitted at 55 into the chambers 48 and after passage through the permeable partition sections 51, said air diffuses throughout the concrete body and expels the excess water which collects at 52, passes through the permeable wall 52 and finally is exhausted at 56.

After the exhausting of at least part of the excess water, steam is admitted through the pipe 55 at a temperature of 120 to 180° C. The steam passing through the porous sections 51 enters the concrete mass and heats the latter before it is exhausted through 52 and 56.

After a very short duration of treatment, the concrete article may be lifted out of the chamber C.

What I claim is:

A method of manufacture of molded objects of concrete, in a mold with elastic and permeable walls, comprising filling the mold with concrete, placing the concrete under compression, passing compressed air through the concrete to ensure the evacuation of excess water by diffusion of the air throughout the mass, passing steam through the concrete at a temperature of 120° to 180° C., passing a fluid which is capable of reacting with the concrete to improve the properties thereof through the mass of concrete, and demolding the completed object ready to be used.

References Cited in the file of this patent

UNITED STATES PATENTS

| | | |
|---|---|---|
| 1,480,740 | Barkschat | Jan. 15, 1924 |
| 1,492,642 | Lake | May 6, 1924 |
| 2,048,253 | Freyssinet | July 21, 1936 |
| 2,172,703 | Freyssinet | Sept. 12, 1939 |
| 2,196,874 | Ruegg | Apr. 9, 1940 |
| 2,528,643 | Dubbs | Nov. 7, 1950 |
| 2,638,655 | Creskoff | May 19, 1953 |
| 2,650,409 | Dubbs | Sept. 1, 1953 |
| 2,798,278 | Johnson | July 9, 1957 |

FOREIGN PATENTS

| | | |
|---|---|---|
| 100,076 | Australia | Jan. 28, 1937 |